（12）United States Patent
Ryu et al.

(10) Patent No.: US 11,661,116 B2
(45) Date of Patent: May 30, 2023

(54) CONNECTING STRUCTURE BETWEEN QUARTER PORTION AND REAR FLOOR

(71) Applicants: HYUNDAI MOTOR COMPANY, Seoul (KR); Kia Corporation, Seoul (KR)

(72) Inventors: Jong Hyun Ryu, Yongin-si (KR); Dong Oh Lee, Suwon-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 115 days.

(21) Appl. No.: 17/398,496

(22) Filed: Aug. 10, 2021

(65) Prior Publication Data

US 2022/0161866 A1  May 26, 2022

(30) Foreign Application Priority Data

Nov. 26, 2020  (KR) .................. 10-2020-0160651

(51) Int. Cl.
*B62D 25/20*  (2006.01)

(52) U.S. Cl.
CPC .................. *B62D 25/2027* (2013.01)

(58) Field of Classification Search
CPC ............... B62D 25/2027; B62D 25/02; B62D 25/2036; B62D 27/02; B60Y 2200/91
See application file for complete search history.

(56) References Cited

FOREIGN PATENT DOCUMENTS

| CN | 106428220 A | * | 2/2017 | ............. B62D 25/08 |
| CN | 107207055 A | * | 9/2017 | ............. B60G 3/06 |
| CN | 111332368 A | * | 6/2020 | |
| DE | 102020201382 A1 | * | 10/2020 | |
| JP | 5830452 B2 | * | 12/2015 | |
| KR | 19980038687 U | * | 9/1998 | |
| KR | 20010087447 A | * | 9/2001 | |
| KR | 101316505 B1 | * | 10/2013 | |
| KR | 2020-0011750 A | | 2/2020 | |

* cited by examiner

*Primary Examiner* — Lori L Lyjak
(74) *Attorney, Agent, or Firm* — Lempia Summerfield Katz LLC

(57) ABSTRACT

The present disclosure relates to a connecting structure between a quarter portion and a rear floor of a vehicle and, more specifically, to a connecting structure between a quarter and a rear floor, which can strengthen torsional rigidity of a vehicle body and secure durability of an opening of a tailgate.

12 Claims, 17 Drawing Sheets

CONNECTING STRUCTURE BETWEEN QUARTER PORTION AND REAR FLOOR

CROSS-REFERENCE TO RELATED APPLICATION

This application claims priority to and the benefit of Korean Patent Application No. 10-2020-0160651, filed on Nov. 26, 2020, the entire contents of which are incorporated herein by reference.

FIELD

The present disclosure relates to a connecting structure between a quarter portion and a rear floor of a vehicle.

BACKGROUND

The statements in this section merely provide background information related to the present disclosure and may not constitute prior art.

A crossmember for a vehicle is a member installed at locations of a front wheel and a rear wheel of a vehicle body in a lateral direction of the vehicle. The crossmember may include a front crossmember and a rear crossmember according to its location at the vehicle.

FIGS. 1A and 1B illustrate a rear crossmember for a vehicle having an internal combustion engine where FIG. 1A illustrates a side rear portion of a vehicle body and FIG. 1B illustrates a rear of the vehicle body in which a tailgate is removed from an opening of the tailgate. A rear crossmember 610 is coupled to rear floor side members 630 coupled to both sides of a rear floor 620 of the vehicle body.

Since an internal combustion engine vehicle has a sufficient rear overhang between the rear crossmember 610 and the tailgate, a chassis input load is absorbed by the rear floor side member 630 and transferred to an upper body of the vehicle through an annular structure of a quarter portion.

On the other hand, in case of a rear wheel-driven electric vehicle, the rear crossmember is increased in size in a longitudinal direction of the vehicle for mounting a motor, a power electronics module, and the like. This causes a rear mounting part of the rear crossmember to approach the opening of the tailgate, and the chassis input load is transferred to the opening of the tailgate.

The foregoing is intended merely to aid in the understanding of the background of the present disclosure, and is not intended to mean that the present disclosure falls within the purview of the related art that is already known to those skilled in the art.

SUMMARY

The present disclosure provides a connecting structure between a quarter portion and a rear floor, which can provide the durability performance of an opening of a tailgate of an electric vehicle, etc., in which the size of a rear side member is increased in a longitudinal direction of the vehicle.

According to one form of the present disclosure, a connecting structure between a quarter portion and a rear floor of a vehicle comprises: a back panel; a rear floor coupled to a first side of the back panel; a quarter rear outer member coupled to a second side of the back panel to overlap the rear floor; and a side outer rear extension coupled to the quarter rear outer member.

The present disclosure provides the connecting structure between the quarter portion and the rear floor, which can efficiently distribute chassis input load, increase torsional rigidity of the vehicle body, and reduce deformation of an opening of a tailgate.

DRAWINGS

In order that the disclosure may be well understood, there will now be described various forms thereof, given by way of example, reference being made to the accompanying drawings, in which.

Figure 3A:
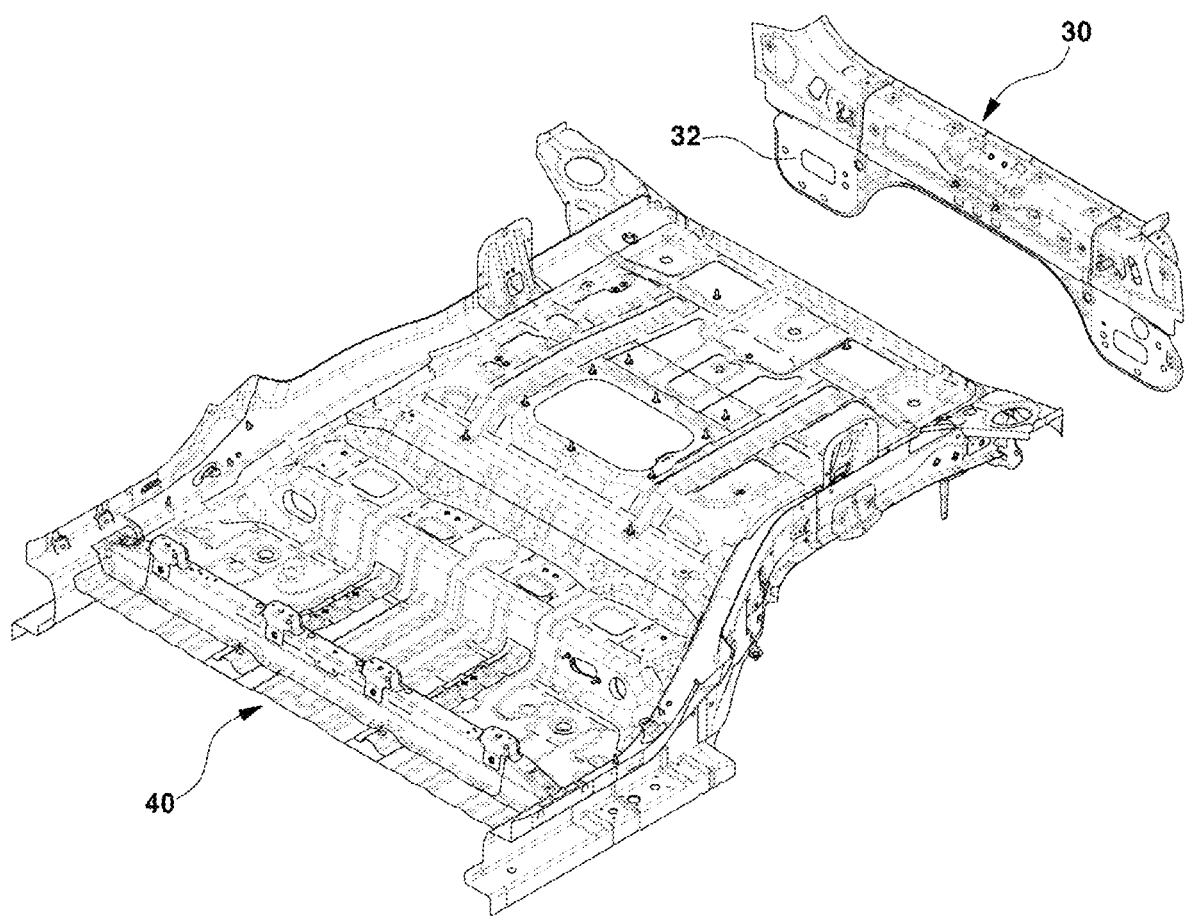
Figure 3B:
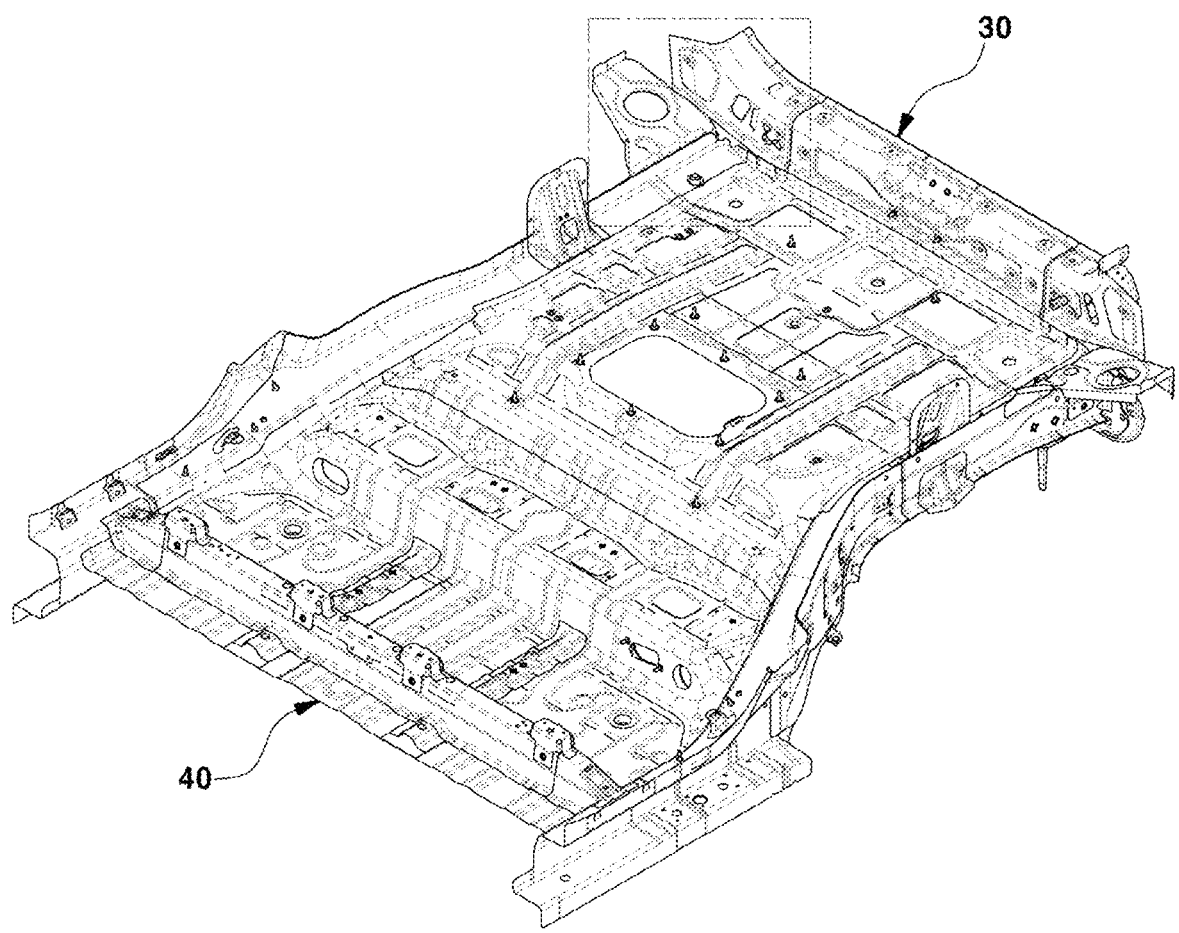
Figure 3C:
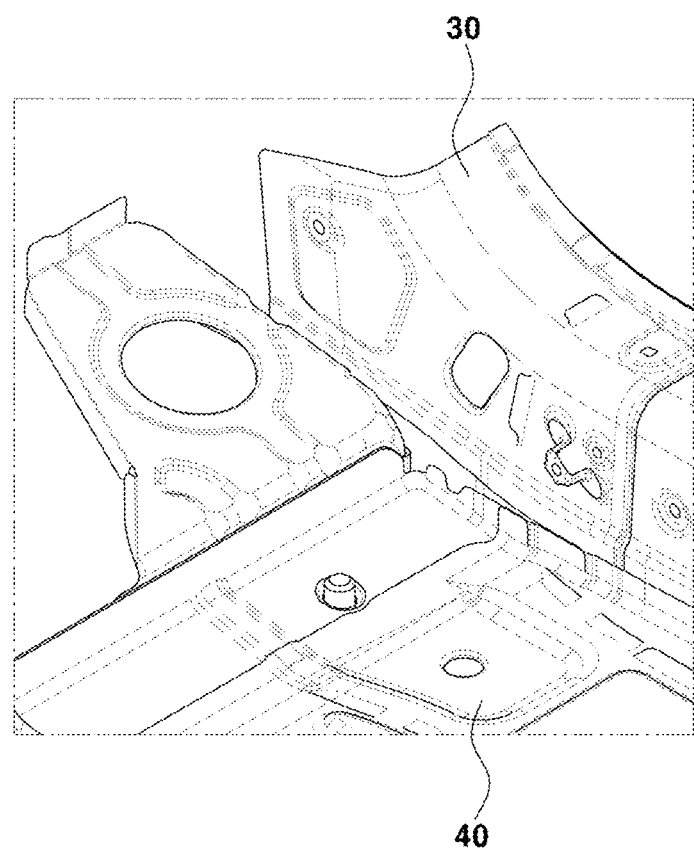
Figure 4:
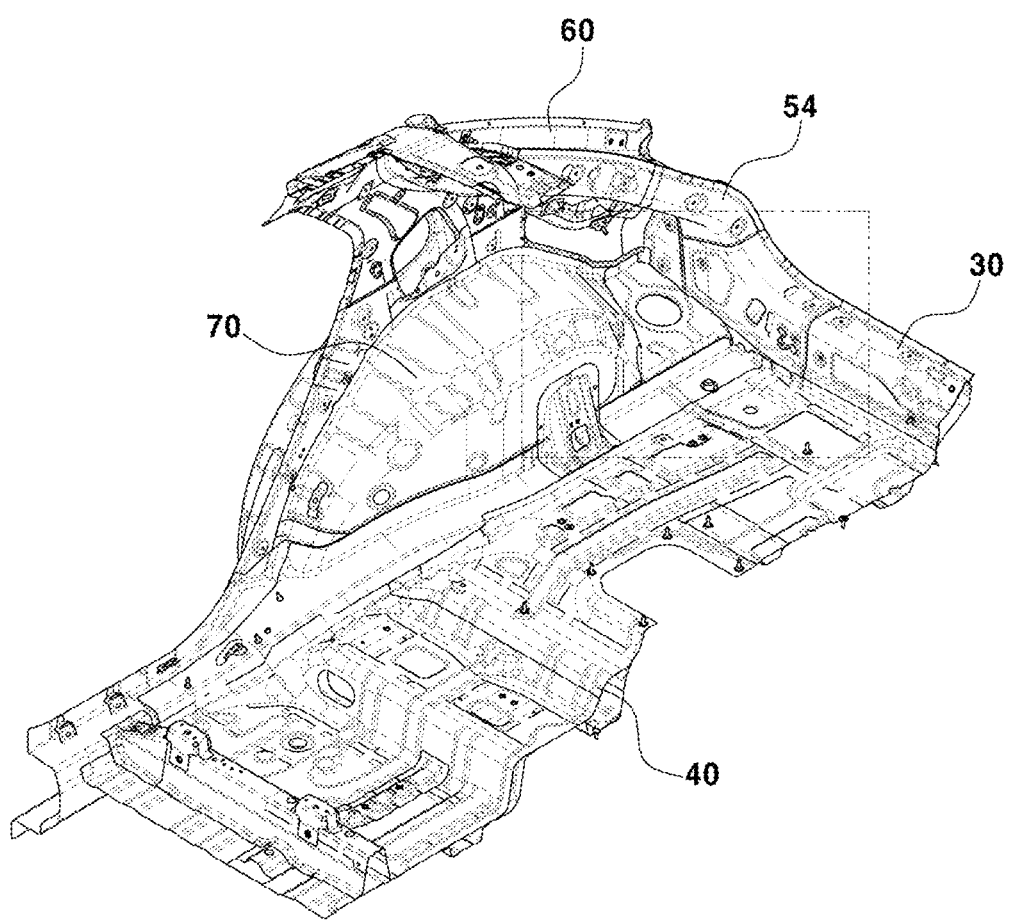
Figure 5A:
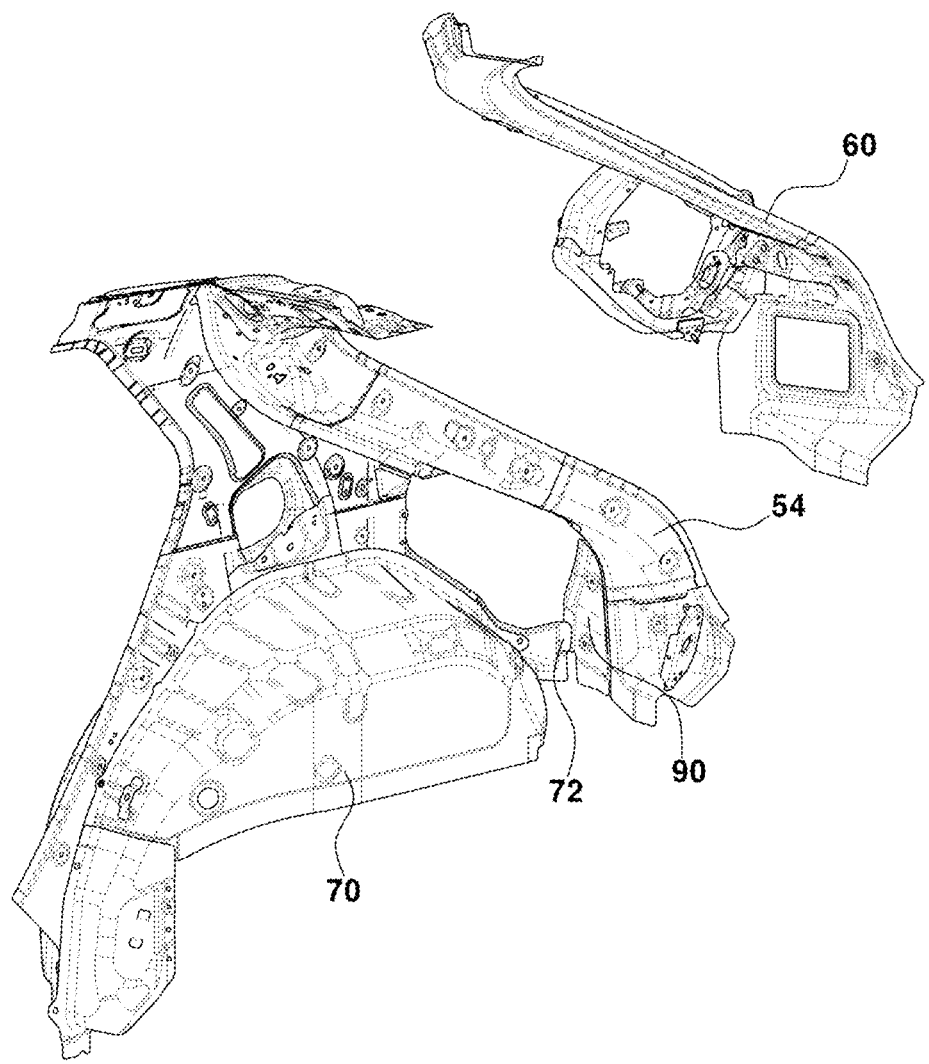
Figure 5B:
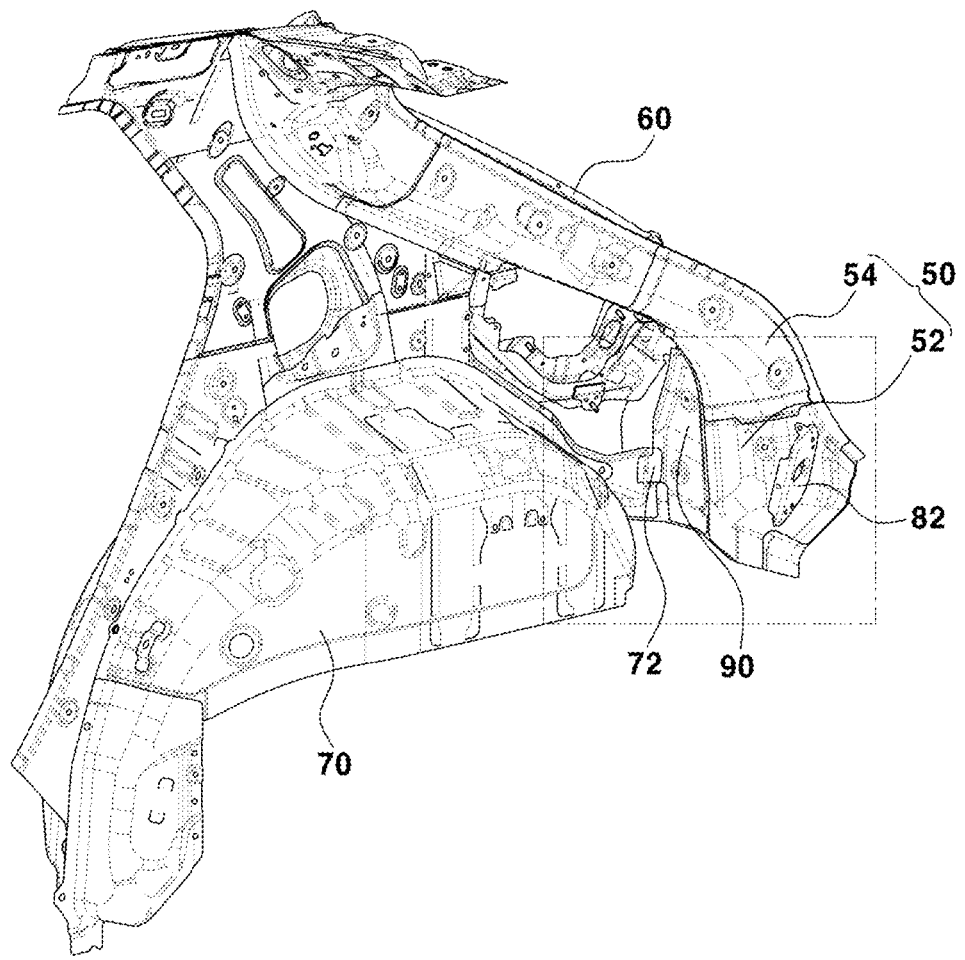
Figure 5C:
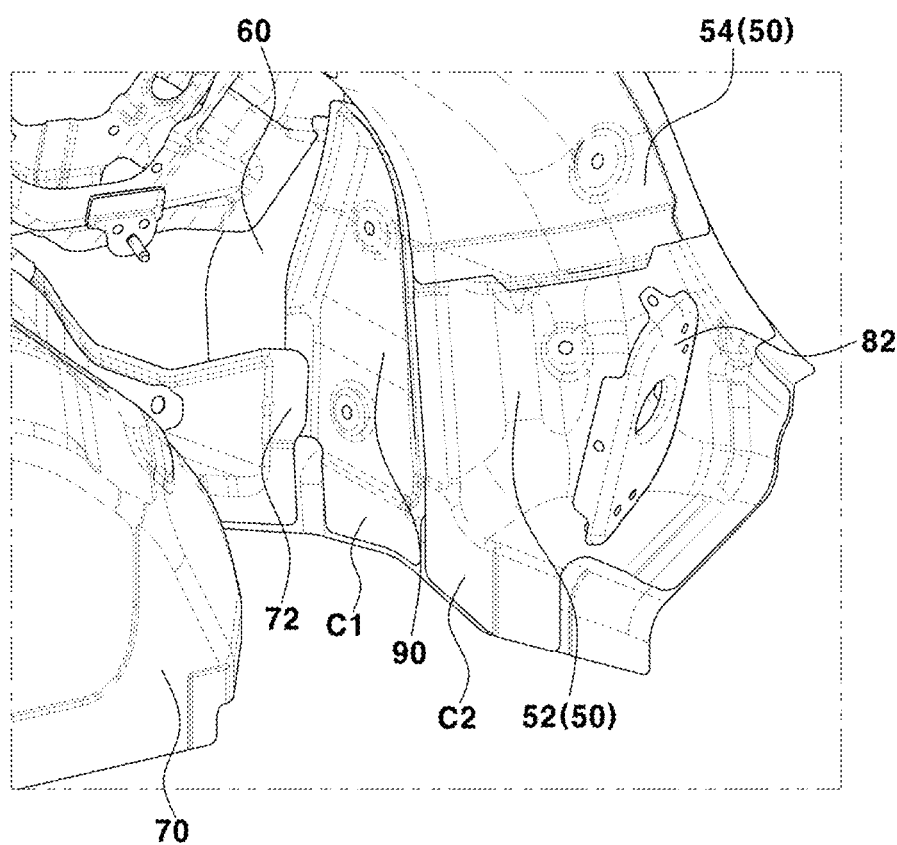
Figure 6A:
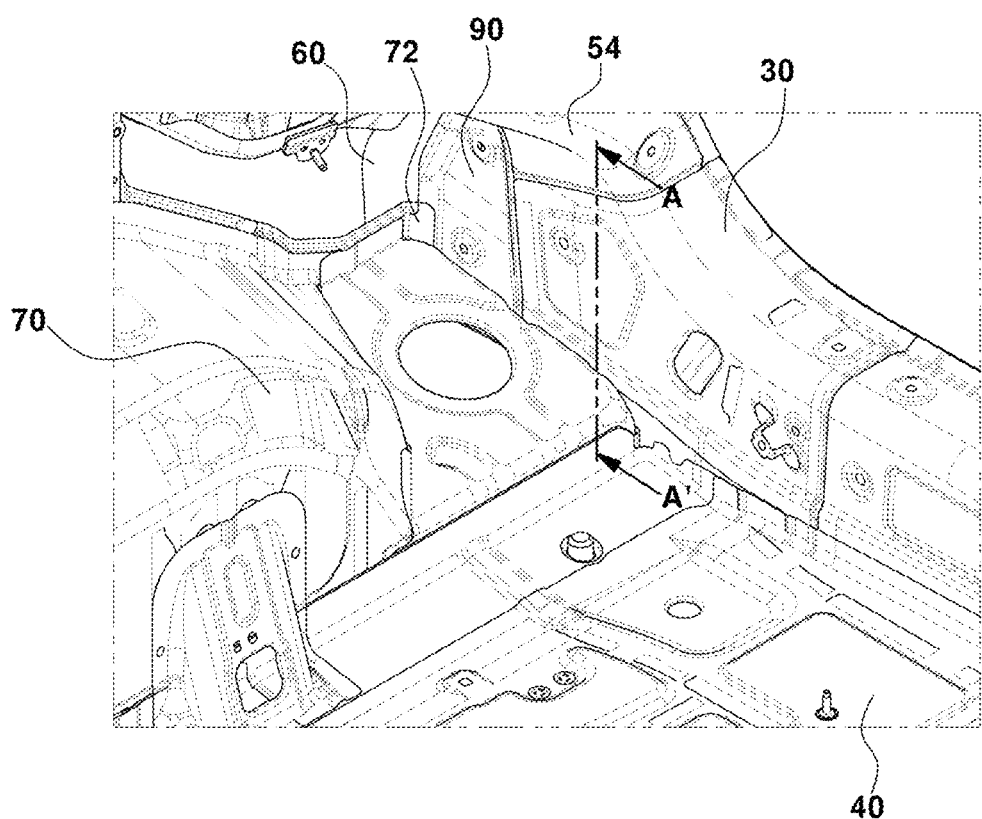
Figure 6B:
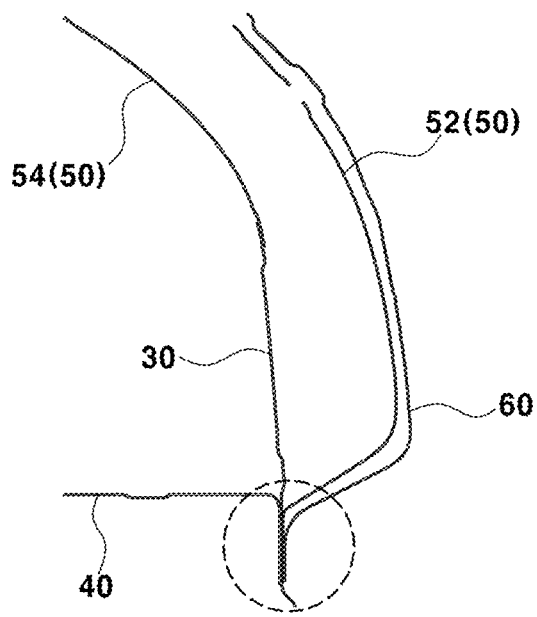
Figure 6C:
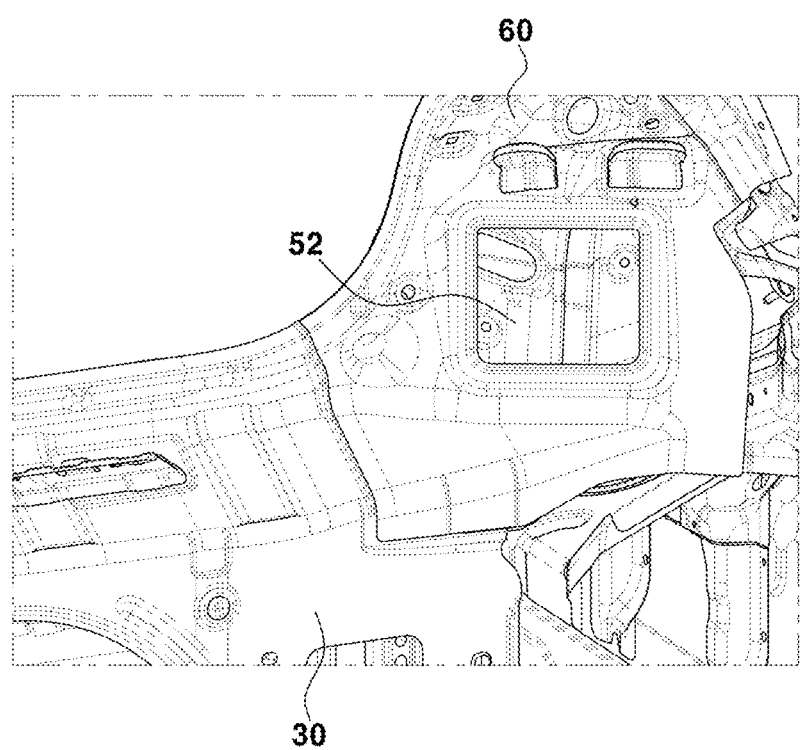
Figure 6D:
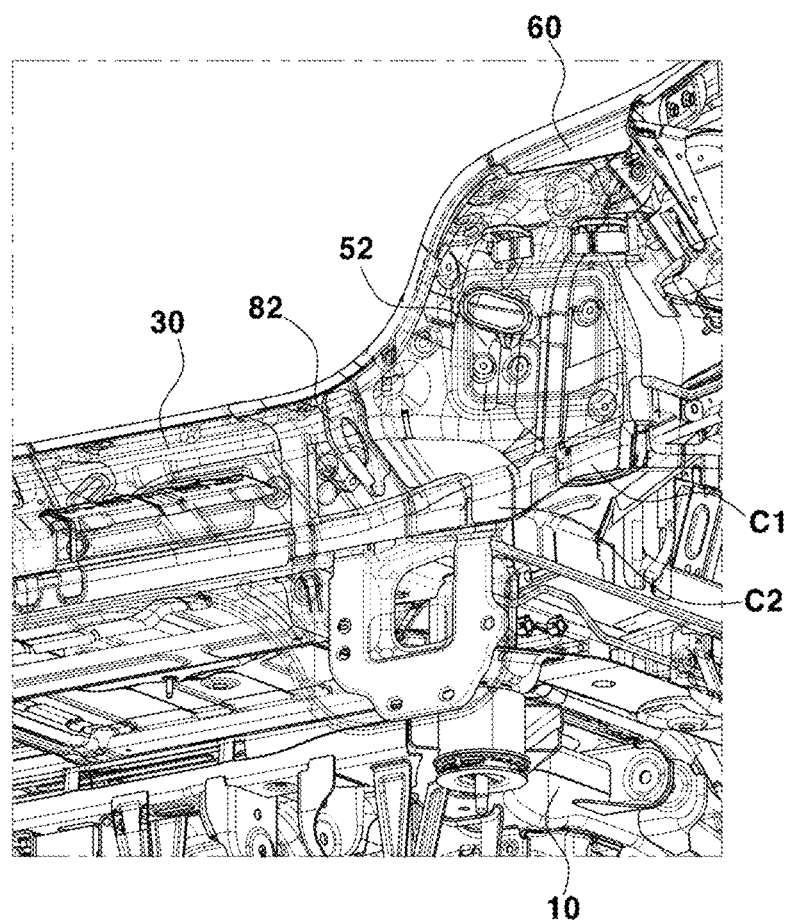
Figure 7:
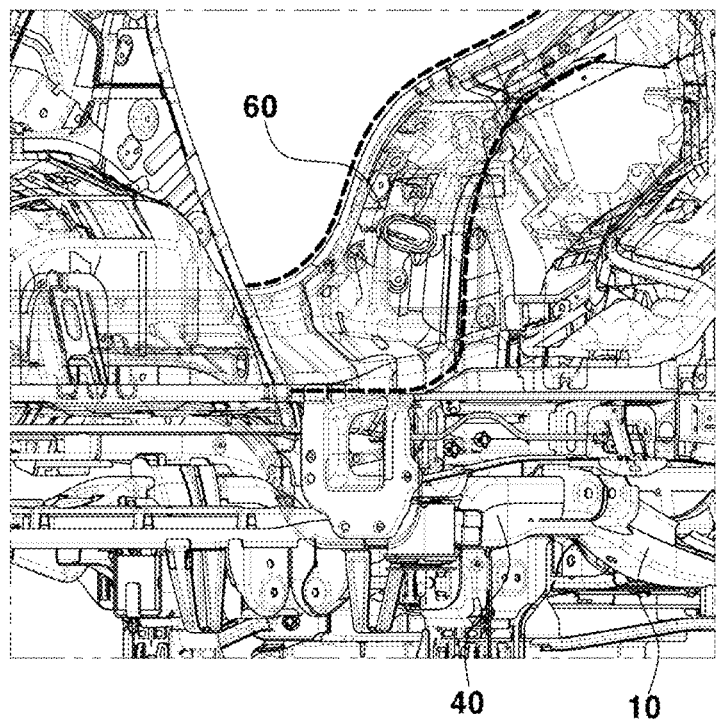
Figure 8A:
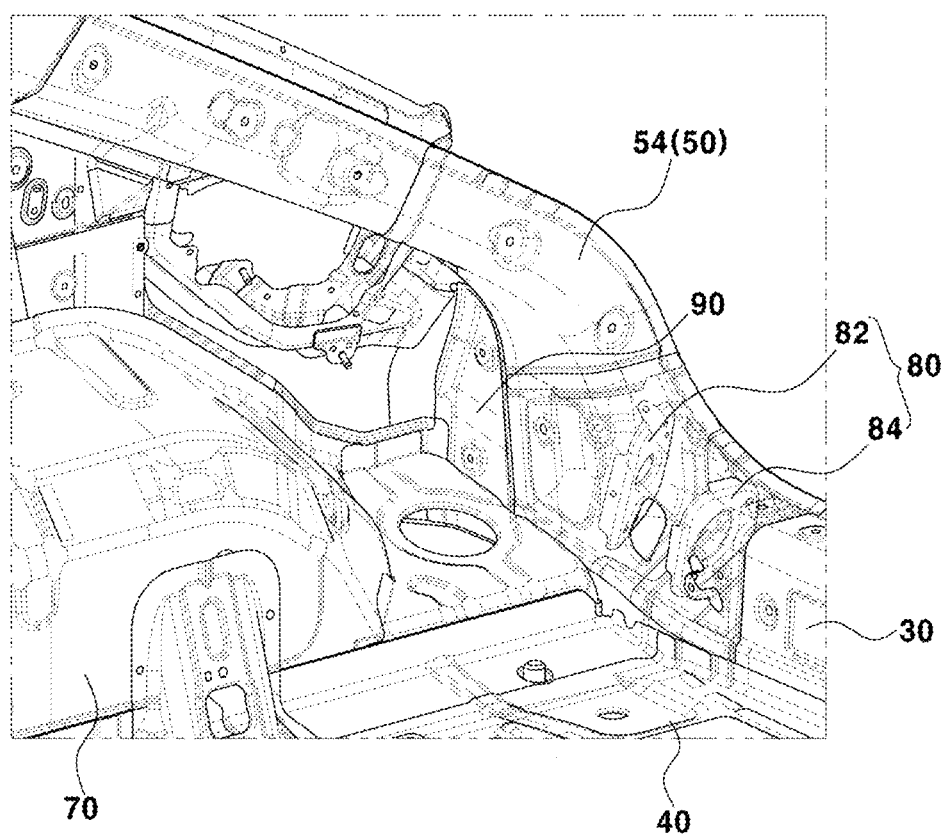
Figure 8B:
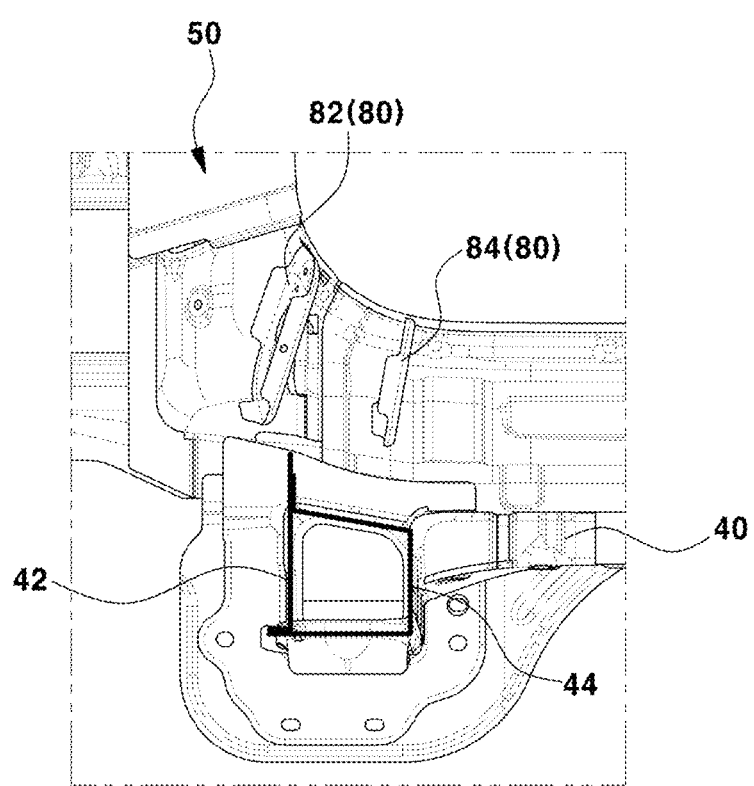
Figure 9:
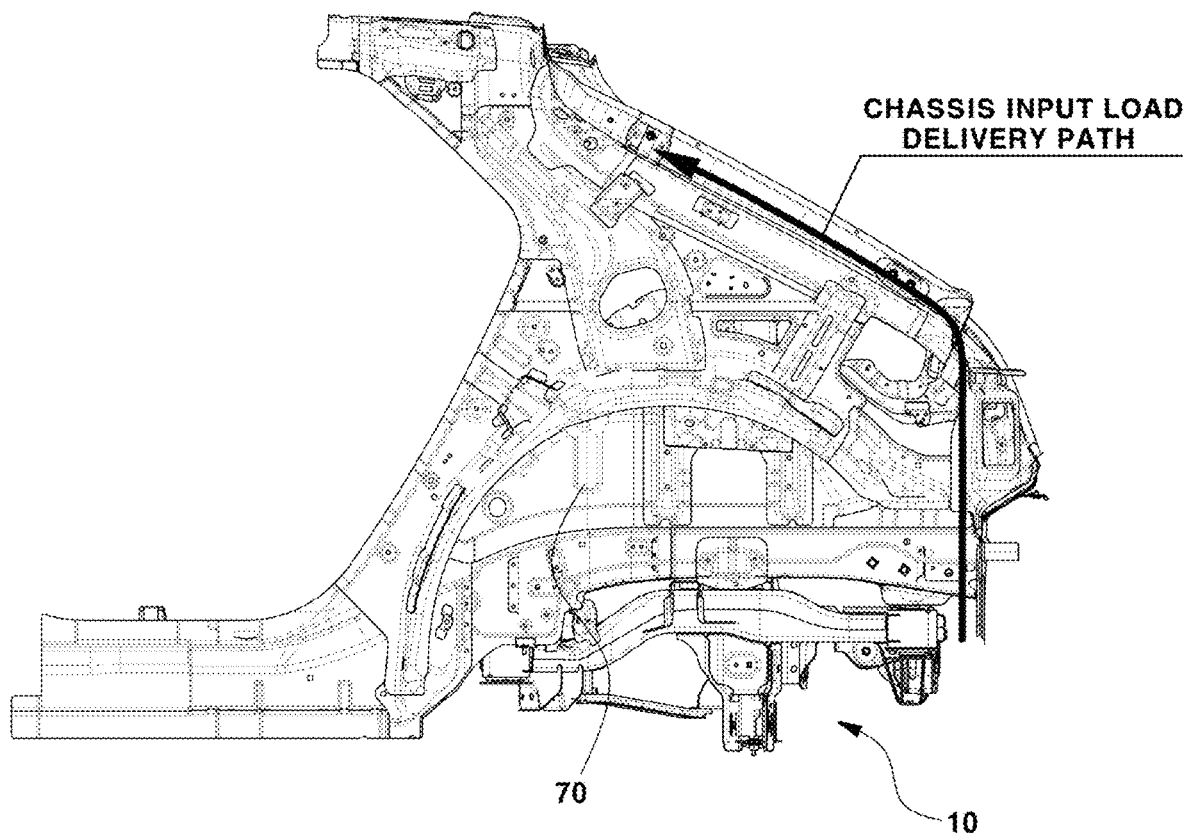

FIGS. 3A to 3C illustrate the coupling state between a rear floor and a back panel in the connecting structure between the quarter portion and the rear floor according to one form of the present disclosure, wherein FIG. 3A is an exploded perspective diagram of the rear floor and the back panel, FIG. 3B is a coupling perspective diagram of the rear floor and the back panel, and FIG. 3C is an enlarged diagram of a portion indicated by the dotted line illustrated in FIG. 3B;

FIG. 4 illustrates a rear floor-back panel assembly coupled to the quarter portion in the connecting structure between the quarter portion and the rear floor according to one form of the present disclosure;

FIGS. 5A to 5C illustrate the coupling between the quarter portion and a side outer rear extension in the connecting structure between the quarter portion and the rear floor according to one form the present disclosure, in which FIG. 5A is an exploded perspective diagram of the quarter portion and the side outer rear extension, FIG. 5B is a coupling diagram of the quarter portion and the side outer rear extension, and FIG. 5C is an enlarged diagram of a portion indicated by the dotted line illustrated in FIG. 5B;

FIG. 6A illustrates the state where the connecting structure between the quarter portion and the rear floor is viewed from the inside of the vehicle;

FIG. 6B illustrates a cross-sectional diagram taken along the line A-A' illustrated in FIG. 6A;

FIG. 6C illustrates the state where the connecting structure between the quarter portion and the rear floor according to one form of the present disclosure is viewed from the outside of the vehicle;

FIG. 6D illustrates the state where a side outer rear extension is seen through in FIG. 6C;

FIG. 7 illustrates the state where the connecting structure between the quarter portion and the rear floor according to one form of the present disclosure is viewed from the outside of the vehicle, and is a diagram for explaining the state where the quarter portion outer rear member and the side outer rear extension extend to a base surface of the rear floor;

FIG. 8A illustrates the state where the connecting structure between the quarter portion and the rear floor according to one form of the present disclosure is viewed from the inside of the vehicle;

FIG. 8B illustrates a part of the front diagram illustrated in FIG. 8A;

FIG. 9 illustrates the delivery path of a chassis input load of the connecting structure between the quarter portion and the rear floor according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, preferred forms of the present disclosure will be described in detail with reference to the accompanying drawings. Specific structures or functions described in various forms of the present disclosure are merely for illustrative purposes. Forms according to the concept of the present disclosure may be implemented in various forms, and it should be understood that they should not be construed as being limited to the forms described in the present specification, but include all of modifications, equivalents, or substitutes included in the spirit and scope of the present disclosure.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

It is understood that the term "vehicle" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles, e.g., fuels derived from resources other than petroleum. As referred to herein, a hybrid vehicle is a vehicle that has two or more sources of power, for example both gasoline-powered and electric-powered vehicles.

Like reference numerals denote like components throughout the specification. In the meantime, the terminology used herein is for the purpose of describing particular forms only and is not intended to be limiting. As used herein, the singular forms "a," "an," and "the" are intended to include the plural forms as well, unless the context clearly indicates otherwise. It will be further understood that the terms "comprise," "include," "have," etc., when used in this specification, specify the presence of stated components, steps, operations, and/or elements, but do not preclude the presence or addition of one or more other components, steps, operations, and/or elements thereof.

Hereinafter, the present disclosure will be described in detail with reference to the accompanying drawings.

Figure 1A:
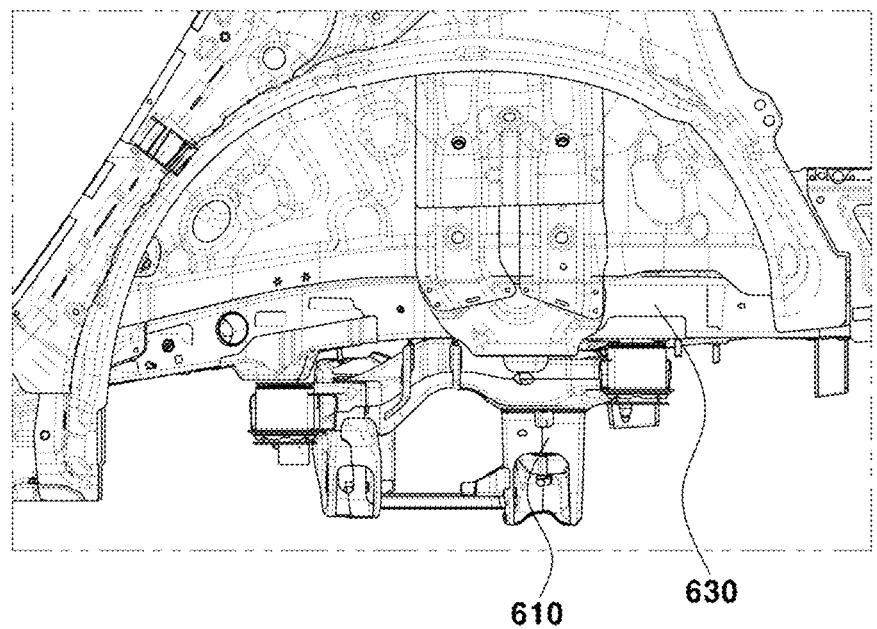
FIG. 1A illustrates a rear crossmember mounted on the side rear of a vehicle with an internal combustion engine.
Figure 1B:
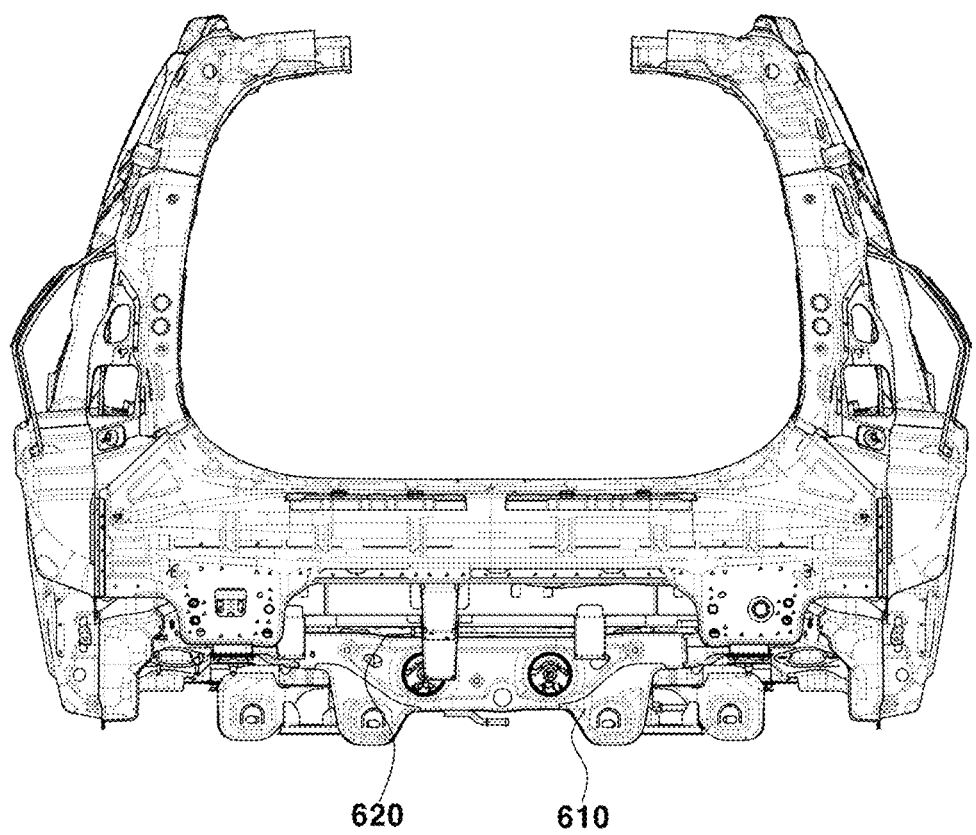
FIG. 1B illustrates the rear crossmember mounted on the rear of the vehicle having the internal combustion engine.
Figure 2:
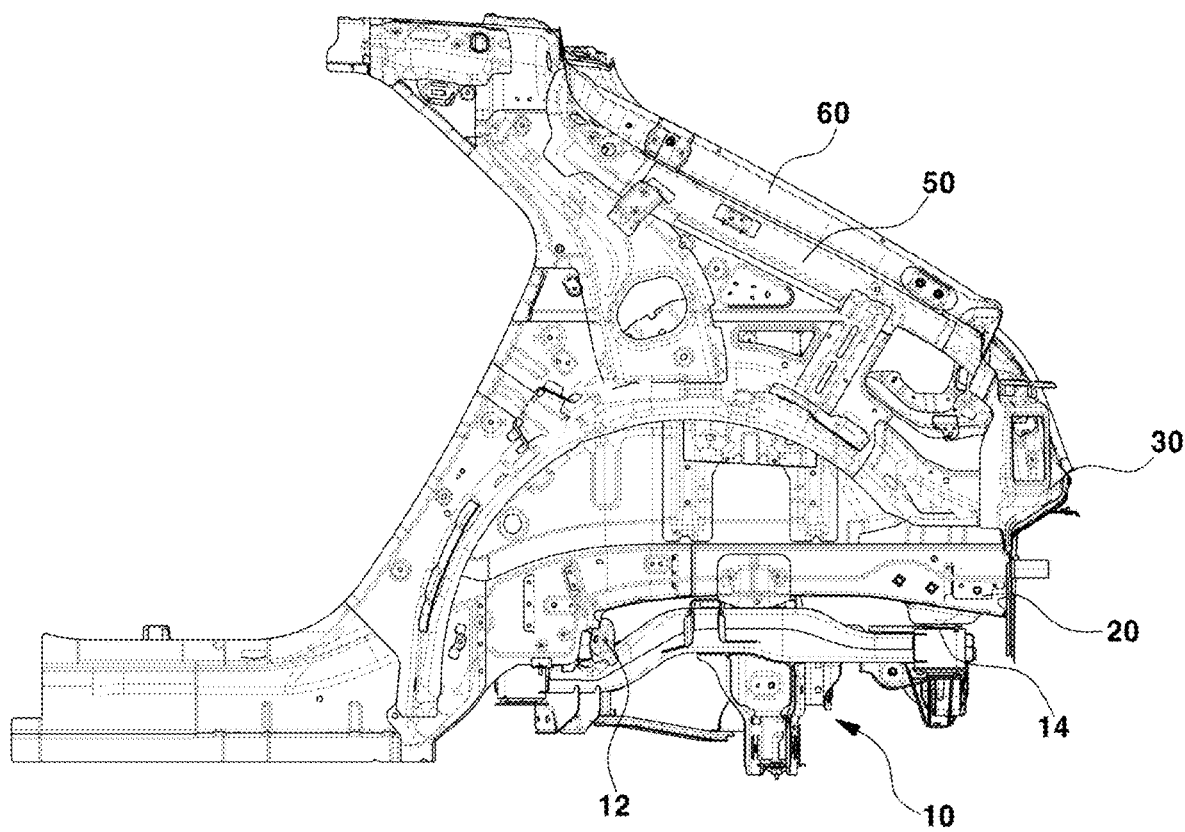
FIG. 2 illustrates a rear crossmember having an increased size in a longitudinal direction of the vehicle and mounted on the side rear of the vehicle, and illustrates a vehicle including a connecting structure between a quarter portion and a rear floor according to one form of the present disclosure.

FIG. 2 illustrates a rear crossmember 10 having the increased size in a front and rear direction of the vehicle compared to the internal combustion engine vehicle.

The rear crossmember 10 is mounted on a rear floor side member 20 through a front mounting part 12 and a rear mounting part 14. Particularly, the rear mounting part 14 is mounted on the rear edge of the rear floor side member 20, and the upper portion of the rear mounting part 14 is connected to an opening member of the tailgate. As described above, since the rear mounting part 14 of the rear crossmember 10 is located in close proximity to the opening of the tailgate, chassis input load is transferred to the opening member of the tailgate. Accordingly, desired is a structure capable of providing the durability of the opening member of the tailgate.

The present disclosure provides a connecting structure between a quarter portion and a rear floor, which can increase torsional rigidity of the vehicle body and decrease displacement of the opening of the tailgate.

Specifically, an exemplary form of the present disclosure includes a structure of simultaneously connecting a back panel 30, a rear floor 40, a quarter rear outer member 52, and a side outer rear extension 60.

According to some exemplary forms of the present disclosure, a flange of a wheel house 70 is extended rearward, and an extension panel 90 is coupled between the wheel house 70 and a quarter rear member 50 such that the side outer rear extension 60 is simultaneously coupled.

Further, some exemplary forms of the present disclosure include a structure of extending the quarter rear outer member 52 and the side outer rear extension 60 to a surface of the rear floor 40.

In some exemplary forms of the present disclosure, a bulk head 80 is included within connecting sections that connect the quarter rear member 50 and the back panel 30 and is provided above a line corresponding to a longitudinal direction of the rear floor side member 20.

As illustrated in FIGS. 3A and 3B, the rear floor 40 is attached to the back panel 30. As illustrated in FIG. 3C, the rear floor 40 is coupled to a back panel flange part 32 of the back panel 30. The rear floor side members 20 are coupled to each of both sides of the rear floor 40. The rear crossmember 10 is disposed between the rear floor side members 20 and supports the rear of the rear floor 40.

As illustrated in FIG. 4, the wheel houses 70 are attached to both sides of the rear floor 40. A quarter portion is provided on the upper side of the wheel house 70. The wheel house 70 includes a wheel house flange part 72 extending rearward. More specifically, referring to FIGS. 5A and 5B, the quarter rear member 50 including the quarter rear outer member 52 and a quarter rear inner member 54 is connected to the upper portion of the wheel house 70. The side outer rear extension 60 is coupled to the outside of the quarter rear member 50. The quarter rear member 50 serves as the side surface member of the opening of the tailgate and connects an under vehicle body to an upper vehicle body. The side outer rear extension 60 is connected to the side outer (not shown), includes an opening flange of the tailgate, and forms the quasi-appearance when the tailgate is open.

As illustrated in FIG. 5C, according to some exemplary forms of the present disclosure, the extension panel 90 is provided. The extension panel 90 extends between the quarter rear outer member 52 and the quarter rear inner member 54. The extension panel 90 is connected to the wheel house flange part 72. A part of the extension panel 90 is simultaneously connected to the wheel house flange part 72 and the side outer rear extension 60. Another part of the extension panel 90 is bonded to the side outer rear extension 60 to connect the side outer rear extension 60, the quarter rear outer member 52, and the quarter rear inner member 54. As indicated by C1 in FIG. 5C, one side of the extension panel 90 is coupled to the side outer rear extension 60. As indicated by C2 in FIG. 5C, the quarter rear outer member 52 is coupled to the side outer rear extension 60 inside the vehicle.

According to the present disclosure, the extension panel 90 can improve the coupling rigidity of a joint to which each component is coupled.

Referring to FIGS. 6A to 6D, the quarter rear outer member 52, the side outer rear extension 60, the rear floor 40, and the back panel 30 are simultaneously connected to each other. As marked by the dotted line in FIG. 6B, the back panel 30, the rear floor 40, the quarter rear outer member 52, and the side outer rear extension 60 include a portion integrally coupled to each other. Therefore, the chassis input load that is input to the rear mounting part 14 of the rear crossmember 10 can be efficiently distributed. Ultimately, the torsional rigidity of the vehicle body can be improved and deformation of the opening of the tailgate can be reduced.

As illustrated in FIG. 7, the quarter rear outer member 52 and the side outer rear extension 60 extend to the base surface of the rear floor 40. This allows the size of the cross section to be improved and provides the continuity of the cross section of the back panel 30 and the cross section of the quarter. Such a structure may enhance the torsional rigidity and durability of the vehicle body and decrease the displacement of the opening of the tailgate.

Referring to FIGS. 8A and 8B, according to some exemplary forms of the present disclosure, one or more bulk heads 80 are provided. The bulk head 80 serves to improve the load transfer efficiency and provide the rigidity within the cross section. The bulk head 80 is disposed on the rear of the back panel 30. Particularly, the bulk head 80 is disposed on a connection portion between the quarter portion and the back panel.

According to one form of the present disclosure, two bulk heads 80 are disposed within the cross section of the connection portion between the rear quarter member 50 and the back panel 30. A first bulk head 82 may be disposed above the rear floor outer member 42 substantially in-line, and a second bulk head 84 may be disposed above the rear floor inner member 44 substantially in-line. The first bulk head 82 and the second bulk head 84 are aligned with the rear floor outer member 42 and the rear floor inner member 44, respectively, with respect to the longitudinal direction of the vehicle.

As illustrated in FIG. 9, the connecting structure between the quarter portion and the rear floor according to the present disclosure can efficiently distribute the input load, thereby increasing the torsional rigidity of the vehicle body and decreasing the displacement of the opening of the tailgate. Therefore, the present disclosure can improve durability of the opening of the tailgate in an electric vehicle as the rear cross member is extended in length in a forward and rearward direction.

Further, various factors including a difference in height between the surface of the rear floor and the cross-section of the back panel and a distance between a joint area provided between the quarter portion and the back portion of the vehicle body made the existing structure disadvantageous when delivering under-chassis input load to the upper body. The connecting structure between the quarter and the rear floor according to the present disclosure can improve the ride & handling (R&H) performance and the durability performance of the vehicle resulting from the improvement in the rigidity.

It should be understood that the present disclosure is not limited to the above described forms and the accompanying drawings, and various substitutions, modifications, and alterations can be devised by those skilled in the art without departing from the technical spirit of the present disclosure.

What is claimed is:

1. A connecting structure between a quarter portion and a rear floor of a vehicle, the connecting structure comprising:
   a back panel;
   the rear floor coupled to a first side of the back panel;
   a quarter rear outer member coupled to a second side of the back panel and configured to overlap the rear floor; and
   a side outer rear extension coupled to the quarter rear outer member.

2. The connecting structure of claim 1, wherein at least a portion of each of the back panel, the rear floor, the quarter rear outer member, and the side outer rear extension overlap and are coupled to each other.

3. The connecting structure of claim 1, further comprising: a quarter rear inner member coupled to an inner side of the quarter rear outer member and connected to the back panel.

4. The connecting structure of claim 3, further comprising: an extension panel extending between the quarter rear outer member, the quarter rear inner member, and the side outer rear extension.

5. The connecting structure of claim 4, further comprising a wheel house connected to the extension panel.

6. The connecting structure of claim 5, wherein the wheel house comprises: a wheel house flange part bent on an edge of a first side of the wheel house and coupled to the extension panel.

7. The connecting structure of claim 6, wherein a portion of the wheel house flange part is connected to the side outer rear extension.

8. The connecting structure of claim 1, further comprising: at least one bulk head disposed on a cross section between the quarter rear outer member and the back panel.

9. The connecting structure of claim 8, wherein the at least one bulk head comprises:
   a first bulk head; and
   a second bulk head disposed to be spaced apart from the first bulk head by a predetermined interval.

10. The connecting structure of claim 9, wherein the rear floor comprises:
    a rear floor outer member formed on both a first side and a second side of the rear floor; and
    a rear floor inner member arranged in the rear floor more inwardly than the rear floor outer member.

11. The connecting structure of claim 10, wherein the first bulk head is disposed to be aligned with the rear floor outer member and is positioned at a first position higher than the rear floor outer member in a vertical direction.

12. The connecting structure of claim 11, wherein the second bulk head is disposed to be aligned with the rear floor inner member and is positioned at a second position higher than the rear floor inner member in the vertical direction.

* * * * *